Nov. 16, 1926.
F. E. WIESER
1,607,109
AUTOMOBILE VENTILATOR
Filed Oct. 22, 1924     2 Sheets-Sheet 1
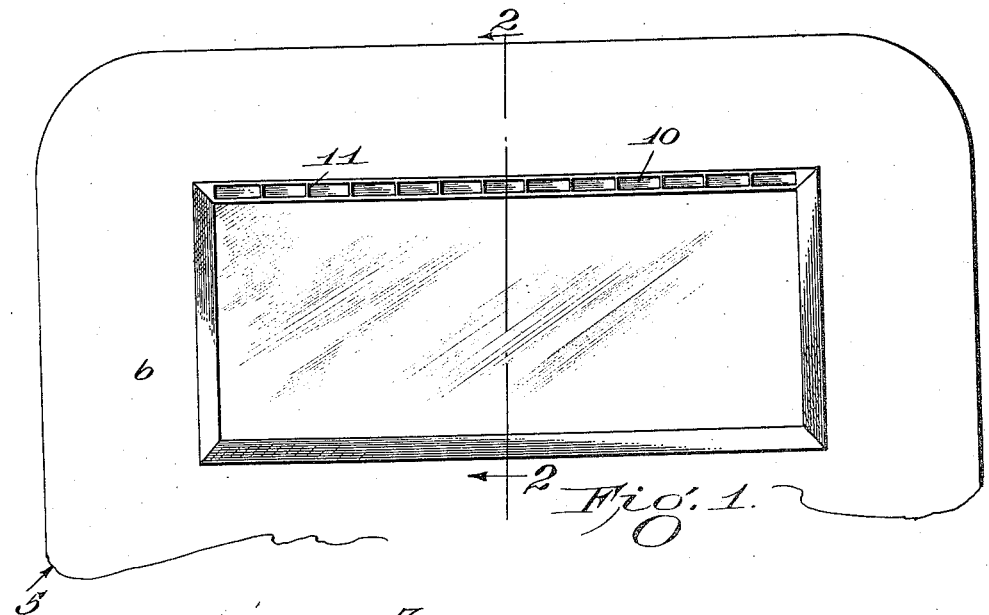
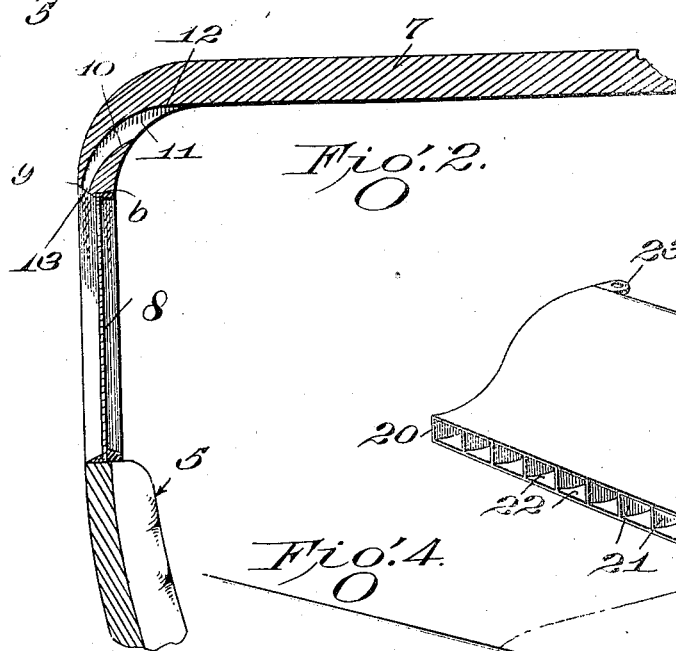
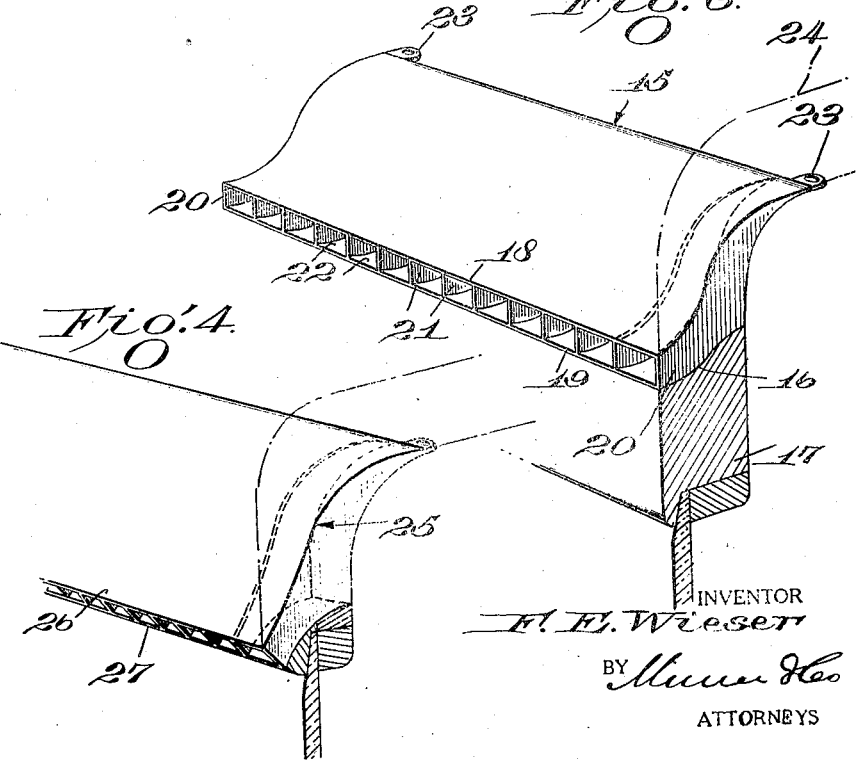
WITNESSES
M. Fowler
INVENTOR
F. E. Wieser
BY
ATTORNEYS

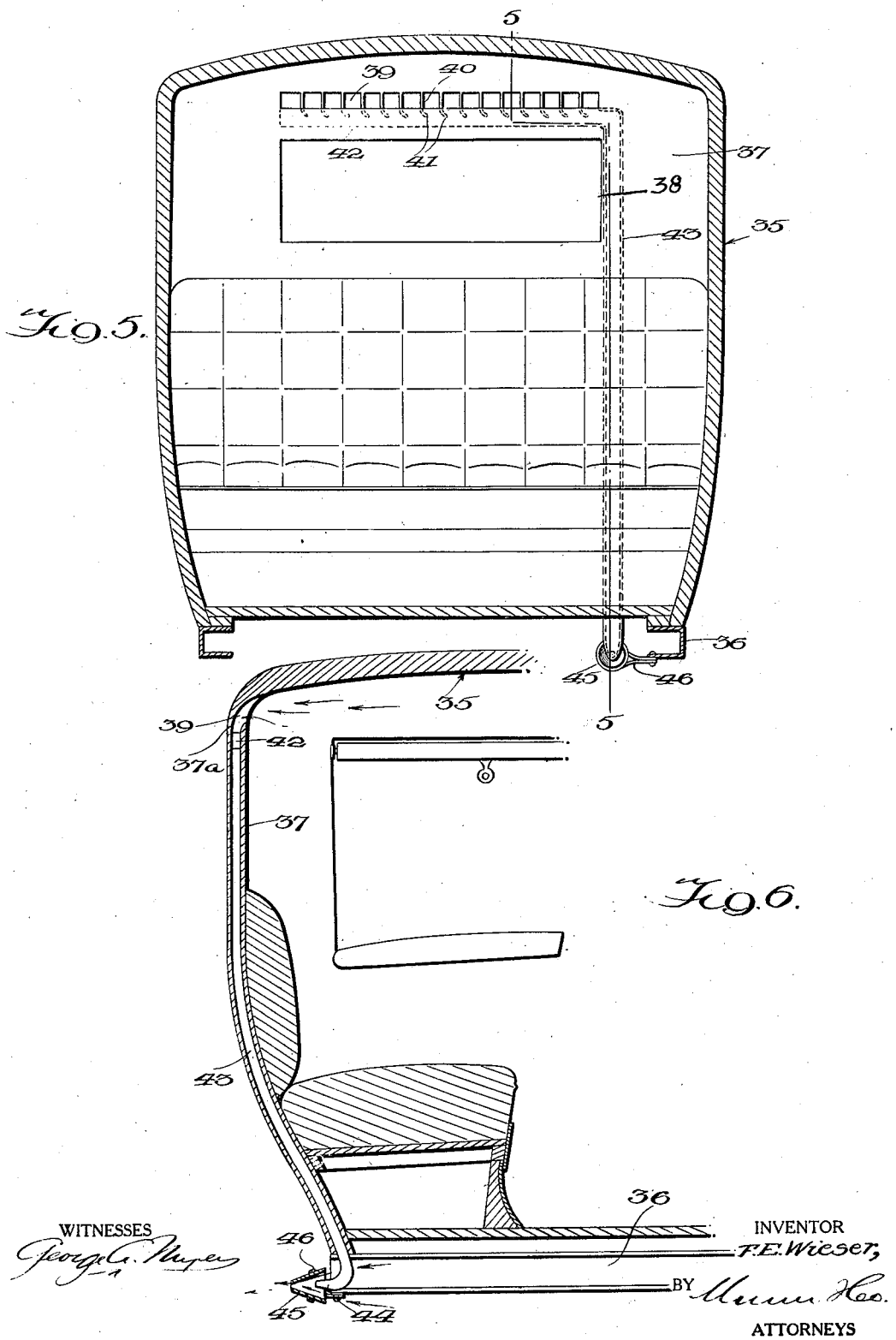

Patented Nov. 16, 1926.

1,607,109

UNITED STATES PATENT OFFICE.

FRANK EDWIN WIESER, OF SAN LUIS OBISPO, CALIFORNIA, ASSIGNOR OF ONE-HALF TO LAFE TODD, OF SAN LUIS OBISPO, CALIFORNIA.

AUTOMOBILE VENTILATOR.

Application filed October 22, 1924. Serial No. 745,192.

This invention relates to automobile ventilators and is especially designed for use with automobiles having the closed type of body.

The object of the invention is the provision of a ventilator for closed cars which is susceptible of incorporation in the structure or body of the car in such manner as not to detract from the appearance of the car or from its structural integrity and which serves to effectively remove the foul or poisonous air or gases that accumulate in the upper part of the car without setting up drafts in the car or exposing the occupants to chilling and undesirable blasts.

A further object is the provision of an automobile ventilator of this character which is of simple and durable construction, reliable in operation, and easy and comparatively inexpensive to manufacture.

Other objects and advantages reside in certain novel features of the construction, arrangement and combination of parts which will be hereinafter more fully described and particularly pointed out in the appended claims, reference being had to the accompanying drawings, forming a part of this specification and in which:

Figure 1 is a view in rear elevation of a closed car body equipped with one embodiment of the present invention, Figure 2 is a view in section on line 2—2 of Figure 1, Figure 3 is a fragmentary, perspective view showing another embodiment of the invention, Figure 4 is a similar view showing still another embodiment of the invention, Figure 5 is a view in elevation of the inside of the car looking to the rear thereof and showing a further modified form of the invention, the sides, top, bottom and frame members of the car structure being shown in section, and Figure 6 is a view in longitudinal section on the line 5—5 of Fig. 5, parts being shown in elevation for the sake of simplicity of illustration.

Referring to the drawing, wherein for the sake of illustration are shown the preferred embodiments of the invention and more particularly to Figures 1 and 2, the numeral 5 designates generally a closed car structure or body which includes a rear wall or back 6 and a top 7. The rear wall 6 is provided with a window or glass panel 8 which is set in the wall with a shoulder or overhanging ledge 9.

In the form of the invention shown in Figures 1 and 2 the ventilating features are designed and intended to be incorporated in the structure of the car when the car body is manufactured. For this purpose the rear wall 6 adjacent the top of the car is provided with a plurality of ventilating passages 10 arranged in a horizontal row across the car just above the window 8 and separated from each other by thin partitions 11. The ventilating passages 9 have large ends 12 communicating with the enclosed compartment of the car at the top and rear thereof. The ventilating passages 10 curve rearwardly and downwardly from the large ends 12 and gradually narrow or constrict to small ends 13 which open through the ledge 9 on the outside of the glass panel 8.

With this arrangement the rarefaction or partial vacuum occurring at the rear of the automobile when the same is in motion causes a suction to be exerted through the ventilating passages 10 thereby drawing the foul or poisonous air or gases from the upper part of the compartment of the car out through the passages to the atmosphere. The constricted form of the passages and the fact that they curve downwardly and open to the atmosphere through the ledge 9 prevents the ingress of rain, dirt and dust and the action of the suction heretofore described also aids to this end.

The form of the invention illustrated in Figure 3 is designed for incorporation in light weight cars and comprises a curved tubular casing 15 which is set in an opening 16 cut in the back or rear walls 17 of a closed car. The casing 15 includes a reversely curved top wall 18, a curved bottom wall 19, vertical end walls 20, and a plurality of vertical partitions 21 defining a plurality of ventilating passages 22. The top wall 18 of the tubular casing 15 is provided with apertured attaching ears 23 designed to be secured to the top 24 of the closed car by suitable fastening devices. As shown in Figure 3 the top wall 18 and bottom wall 19 are disposed close to each other at the rear of the car, that is at the point where the ventilating passages 22 communicate with the atmosphere but these walls diverge from each other forwardly so that they are far apart at the point where they communicate with the interior of the car. Thus as in the other embodiment of the invention the ventilating passages are constricted toward their outlets and curved rearwardly and downwardly. The outlet ends of the passages 22 are disposed in a substantially vertical plane.

In the form of the invention illustrated in Figure 4 a tubular casing 25 is provided and is identical with the casing 15 except that its top wall 26 and its bottom wall 27 are curved more sharply downwardly so that the outlet ends of the ventilating passages are disposed at an angle of 45 degrees just above the window in the rear wall of the car. The casing 25 in all other respects is similar to the casing 15. The type of construction illustrated in Figure 4 is well adapted for use with heavy types of car bodies.

It is to be understood that the outlet ends of the passages 10 of the form of the invention shown in Figures 1 and 2 may be located in a horizontal plane or may be disposed at an angle as found suitable and desirable.

Under some circumstances it may not be desirable to extend the ventilating openings or passages entirely through the rear wall of the car body and the structure shown in Figs. 5 and 6 is designed with this in mind. In Figs. 5 and 6 a car body is designated generally at 35 and is supported in the usual manner on the frame 36. The car body includes a rear wall 37 having a window 38 therein. A plurality of ventilating passages 39 are formed in the rear wall 37 above the window 38, the passages 39 being defined by vertical partitions 40, the lower ends of which are deflected or curved laterally, as indicated at 41. As shown in Fig. 6 the passages 39 communicate with the interior of the car body but do not extend entirely through the rear wall of the car since a sectional portion 37ᵃ of the rear wall closes off these passages from the atmosphere at the rear. The passages 39 communicate with a transversely extending passage or manifold 42 which connects at one side with a suction line 43. The suction line 43 extends down through the rear wall and terminates in a rearwardly directed nozzle or jet 44 which enters and is axially arranged in a conical ejector tube 45 supported by a bracket 46 on the frame 36.

In operation with the form of the invention shown in Figs. 5 and 6 when the car is moving forwardly air will pass rapidly through the ejector tube 45 which is so shaped and formed as to increase the velocity of the air passing therethrough. The air which passes at a high rate of speed through the tube 45 also moves at a similar rate past the open end of the jet or nozzle 44 and consequently entrains the air in the suction line 43 and causes suction to be exerted through the line 43 and consequently through the manifold 42 and through the ventilating passages 39, thereby drawing the foul air and gases from the upper part of the interior of the car and discharging the same to the atmosphere rearwardly of the car. It is to be noted that the ejector tube 45 is located adjacent the rear of the car so that the vacuum or rarefication products at the rear of the car aid in the introduction of a moving current of air through the suction line 43.

I claim:—

1. A closed car structure having a top and a rear wall provided with a window, the window being set in the rear wall, the portion of the rear wall above the window providing an overhanging shoulder, said rear wall having downwardly curving ventilating passages communicating with the interior of the car at the juncture of the rear wall and top and extending downwardly through the overhanging shoulder and opening to the exterior through the underface of the shoulder to communicate with the atmosphere.

2. A closed car structure having its rear wall provided with downwardly curving ventilating passages, the ventilating passages communicating with the interior of the car at their upper ends and communicating with the exterior of the car at their lower ends, the upper ends of the passages being relatively large and flaring, the lower ends of the passages being relatively small and contracted.

3. A closed car structure having its rear wall formed with a downwardly curving opening and having vertical partitions in said opening defining downwardly curved ventilating passages, the ventilating passages communicating with the interior of the car at their upper ends and communicating with the exterior of the car at their lower ends, the upper ends of the passages being relatively large and flaring, the lower ends of the passages being relatively small and contracted.

FRANK EDWIN WIESER.